United States Patent [19]
Feinler

[11] Patent Number: 5,945,015
[45] Date of Patent: Aug. 31, 1999

[54] COMBINATION SOLDERING AND DESOLDERING DEVICE WITH FLUX AND SOLDER STORAGE CHAMBERS

[76] Inventor: Siegfried Feinler, Schlesierstrabe 5, Spaichingen, Germany, D-78549

[21] Appl. No.: 08/817,334
[22] PCT Filed: Sep. 27, 1995
[86] PCT No.: PCT/EP95/03820
  § 371 Date: Mar. 27, 1997
  § 102(e) Date: Mar. 27, 1997
[87] PCT Pub. No.: WO96/10467
  PCT Pub. Date: Apr. 11, 1996

[30]     Foreign Application Priority Data

Oct. 1, 1994 [DE] Germany ............... 44 35 323

[51] Int. Cl.$^6$ .............................................. H05B 1/00
[52] U.S. Cl. .............................................. 219/229; 228/51
[58] Field of Search .............................. 219/229–231, 219/233, 236–239; 228/51–53, 18, 33

[56]         References Cited

U.S. PATENT DOCUMENTS 3,393,856  7/1968  Fortune ........................... 228/51
3,443,734  5/1969  Fortune ........................... 228/51
3,484,033  12/1969 Sachs ............................ 219/229
4,187,972  2/1980  Vella ........................... 228/20.5
5,031,817  7/1991  Chen ........................... 228/20.5
5,151,574  9/1992  Urban ........................... 219/241

FOREIGN PATENT DOCUMENTS 2637520  4/1990  France .
3143688  5/1983  Germany .
 986668  1/1983  U.S.S.R. ......................... 228/52

Primary Examiner—Philip H. Leung
Assistant Examiner—Vinod D Patel
Attorney, Agent, or Firm—McGlew and Tuttle, P.C.

[57]          ABSTRACT

More particularly, the invention relates to a hand soldering device including a heat insulating handle part, a soldering tip and a heating device, by means of which the soldering tip can be heated to particular soldering temperature, whereby in the handle part and/or in the region of the heating device at least two reception chambers are provided.

20 Claims, 2 Drawing Sheets

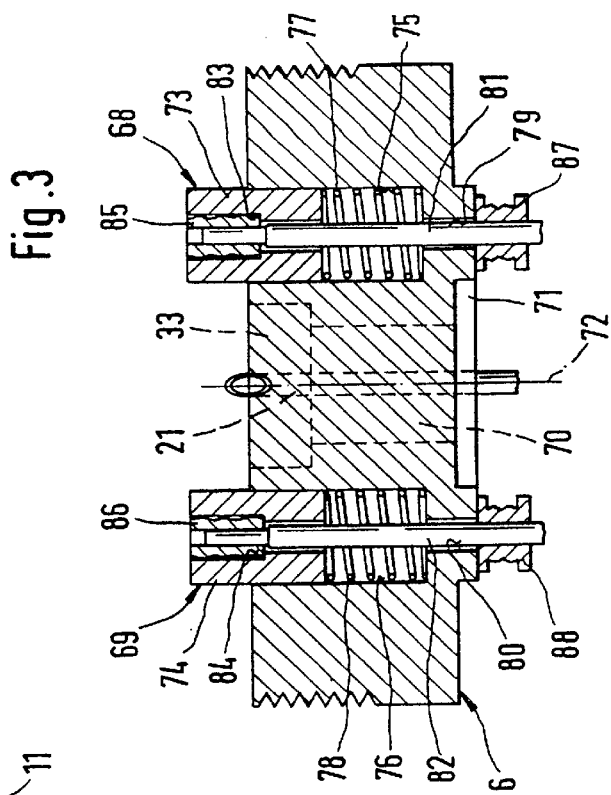
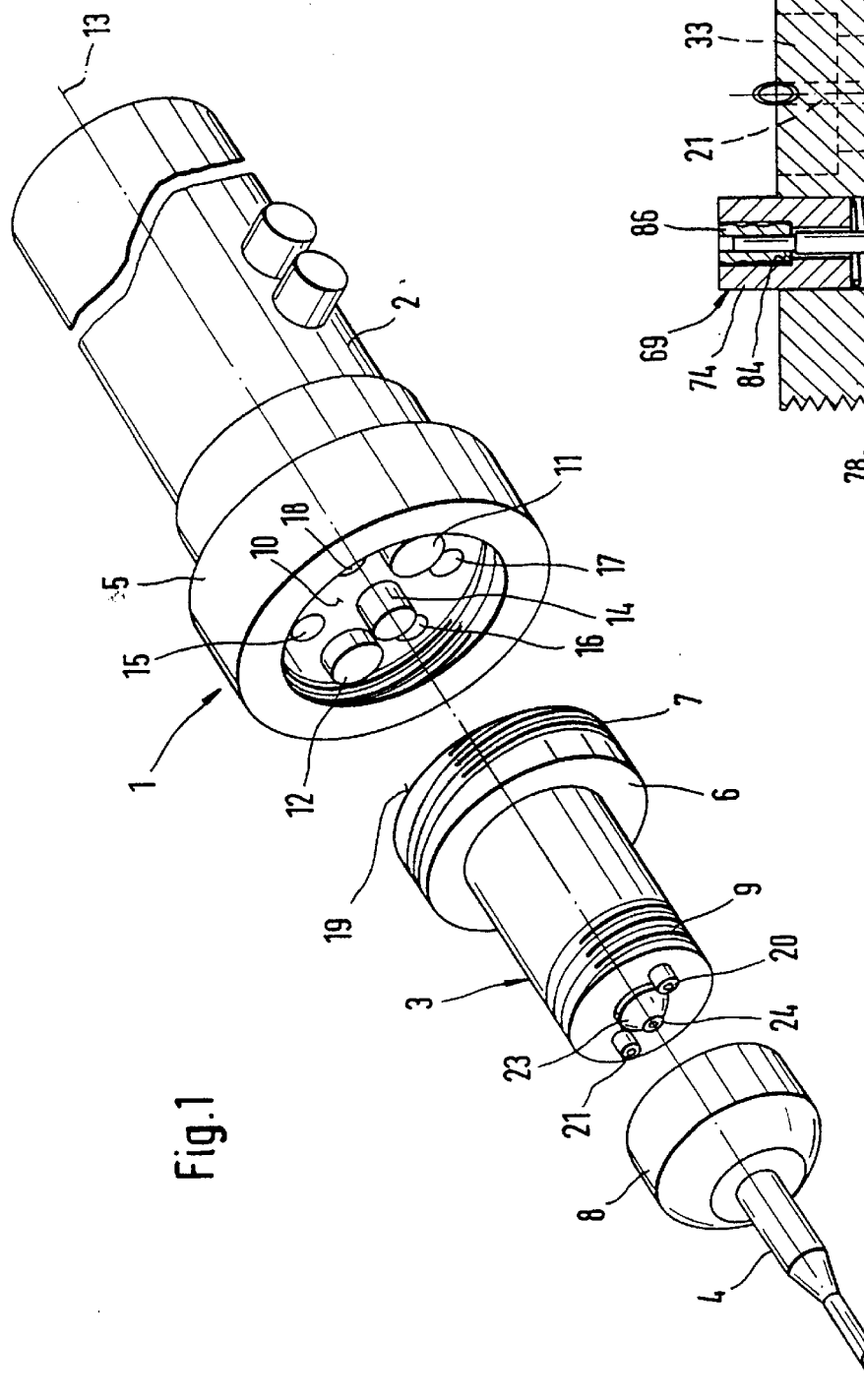

COMBINATION SOLDERING AND DESOLDERING DEVICE WITH FLUX AND SOLDER STORAGE CHAMBERS

FIELD OF THE INVENTION

The present invention relates to a hand soldering device.

More particularly, the invention relates to a hand soldering device including a heat insulating handle part, a soldering tip and a heating device, by means of which the soldering tip can be heated to particular soldering temperature, whereby in the handle part and/or in the region of the heating device at least two reception chambers are provided.

BACKGROUND OF THE INVENTION

A hand soldering device of the type mentioned is known (FR 2 637 520 Al), which device is designed to be in substantially rod-shaped form and has two reception chambers. One of the reception chambers is designed as a soldering chamber and serves for receiving the soldering material. The soldering chamber is designed to be somewhat cylindrical and has a press plunger, which is springloaded and is displaceable in the soldering chamber. The soldering chamber furthermore is provided in the region of a heating arrangement, which serves for heating both the soldering tip as well as the soldering chamber to a predetermined soldering temperature. The soldering material, which is heated in the soldering chamber by means of the heating arrangement and is liquified, arrives by way of a manually operable supply valve and by way of an associated solder supply channel, which joins the soldering tip to the soldering chamber, to the front end of the soldering tip. The second reception chamber is designed cylindrically and is designed as storage chamber for receiving a flux, whereby it also has a springloaded pressing piston. By means of a second manually operable supply valve, flux arrives to the soldering position simultaneously with the first supply valve of the soldering chamber by way of a second tubular conduit on the operated supply valve. The tubular conduit of the storage chamber thereby is bent off in the region of the end of the soldering tip towards the soldering tip so that the flux simultaneously can be supplied with the soldering material by operation of the supply valves to the soldering position. The two reception chambers are integratedly arranged in the hand soldering device and cannot be exchanged. For refilling, the reception chambers are respectively provided with an outer supply opening, by way of which respectively soldering material or flux can be charged through an outer supply opening. For refilling soldering material or flux the two pressing pistons respectively can be withdrawn by means of a pull rod against the spring force of respectively one of the compression springs into their respective starting position. The respective pressing force of the two compression springs thereby is adjustable in axial direction by means of an adjustable adjustment screw. The pull rods of the respective pressing pistons thereby are arranged in an associated through hole of the associated adjustment screw and project beyond the adjustment screw respectively outwardly so that they can be manually operated.

The known hand soldering device is intended for simple soldering of constructional parts, in that a one hand operation of the hand soldering device is possible due to the simultaneous supply soldering material and flux through the hand soldering device. However, in the case of manual soldering work, it often happens that in particular excessive soldering material arrives to the soldering position, which subsequently has to be removed therefrom. Furthermore in the case of repair work also partially individual constructional parts are to be soldered off from a sheet bar and are to be replaced by a repeated soldering procedure by of corresponding spare parts. Thus for these working operations for removing excessive soldering material or for desoldering, a separate suction arrangement or desoldering arrangement must be provided. This means that increased work for the operating personnel because the working device has to be exchanged for suction and for desoldering. Furthermore increased investment costs for the operation result because for this suction off of excessive soldering material or for desoldering a special suction apparatus or desoldering apparatus must be made available.

The maintenance of the prior-art manual soldering device is also extremely expensive, because can be taken apart, e.g., for repair purposes, with difficulty at best. During such cleaning operations of the manual soldering device, which is necessary in the case of prolonged operation, the manual soldering device must be subjected to a special cleaning process, which can be performed by a specially trained personnel only, because of its complicated design. The manual soldering device is thus unavailable for soldering operations for a rather long time.

An electrical soldering iron, whose complete grip part is designed as a suctioning device for suctioning flux or solder material, has become known from U.S. Pat. No. 5,031,817. The electrical soldering pit has a cylindrical tube and a head part with a central hole for this purpose. The head part is arranged pivotably mounted on one front side of the cylindrical tube. A plunger with a plunger rod is provided at the front end of the cylindrical tube, and the plunger rod is surrounded by a spring, which presses the plunger. A magnet coil, which can be activated via a pushbutton at the rear end of the cylindrical tube, is arranged at the rear end of the cylindrical tube. With the plunger deenergized, the magnet coil is pushed forward by the spring. By actuating the pushbutton, the magnet coil is energized, and the plunger is retracted in the cylindrical tube, so that solder material can be sucked off from the soldering tube, so that solder material can be sucked off from the soldering point via a suction channel opening in the blowpipe nozzle. Existing soldered joints can be unsoldered with this electrical soldering iron. However, flux and solder material must continue to be fed in externally to prepare soldered joints, so that the operator needs both hands for soldering, and the components must be held in their desired positions by special devices.

SUMMARY AND OBJECTS OF THE INVENTION

It is an object of the invention to improve a hand soldering device of the type mentioned such that it can be used without additional holding devices for the components to be soldered and that a desoldering and the simultaneous separation of two components from each other or also a removal of excessive soldering material from the soldering position should be possible.

According to the invention, a hand soldering device includes a heat insulated handle part, a soldering tip and a heating device, by means of which the soldering tip is heatable to a predetermined soldering temperature, whereby in the handle part and/or in the region of the heating arrangement at least two reception chambers are provided.

At least one of the reception chambers is intended for soldering material and/or flux, from which soldering material and/or flux material can be supplied in dosed form to the soldering tip by way of at least one supply channel and that one of the reception chambers is formed as suction chamber, in which, by way of a suction channel, excessive soldering material and/or excessive flux material can be sucked from a soldering joint.

The reception chambers may be cylindrically shaped and may be integratedly arranged as separate constructional parts exchangeably in the hand soldering device.

The heating device may be provided as a double-walled heating element consisting of at least one temperature sensor, an outer heating tube and an inner heating tube, in which an electrical heater coil is arranged, and that a reception chamber for housing the soldering material may dip as soldering chamber at least partially into the heating arrangement, and a further reception chamber may be provided as auxiliary chamber for the flux.

The soldering chamber and the auxiliary chamber respectively may have a pressing piston for dosed feeding of the soldering material or the flux material to the soldering tip, which is displaceable mechanically, pneumatically or hydraulically in the soldering chamber or in the auxiliary chamber.

The suction chamber may be arranged in the hand soldering device outside, the heating device and is joined to a sub-pressure producing suction arrangement, and the suction chamber may be joined to the soldering tip by means of at least one suction channel terminating in the soldering tip.

The suction arrangement may be formed of a venturi tube, which is charged by way of a manually or electrically controllable compressed air valve from a compressed air reservoir with compressed air and produces a sub-pressure by way of a sub-pressure conduit in the suction chamber.

The compressed air storage container may be integratedly arranged as compressed air cartridge in the handle part of the hand soldering device and may be joined by way of manually or electrically controlled compressed air valves to the venturi nozzle and/or to the soldering chamber and/or the auxiliary chamber.

The suction channel may terminate in the soldering tip together with the supply channel and/or the supply channel of the soldering chamber and/or the auxiliary chamber in a common end channel, of which the outlet opening is arranged at the outer end of the soldering tip.

A suction piston may be arranged in the suction chamber, which piston is displaceable in the suction chamber and that the suction piston is mechanically, pneumatically or hydraulically axially movable in the suction chamber.

The press piston and/or the press pistons and the suction piston may be electrically motor movable by way of a spindle drive in the soldering chamber or the auxiliary chamber or the suction chamber.

For controlling the pressing pistons or suction piston, suitable manually operable electrical push button switches and/or compressed air valves are provided, which may be arranged in the region of the end of the handle part located in the region of the front end of soldering tip.

The heating device may be attached removably at the handle part and the soldering tip may be removably attached at the handle part opposite to the end of the heating housing.

The heating arrangement may be provided with joining channels which join the supply channel and/or the supply channels and/or the suction channel of the soldering tip with the soldering chamber and/or the auxiliary chamber and/or the suction chamber.

For energy and compressed air supply, a separate control device may be provided, by means of which the compressed air supply for the soldering chamber and/or the auxiliary chamber and/or the venturi nozzle and the temperature of the hand soldering device is controllable.

Electrically operable compressed air valves may be provided in the control device for compressed air control for the soldering chamber, the auxiliary chamber and/or the venturi nozzle, which are valves controllable by means of manually operable electrical push button switches arranged in the handle bar.

The heating device may have a coupling flange for releasable attachment to the handle part, by way of which it is fixedly attachable by means of a screw cap at the handle part, and that for the energy supply of the heating device in the handle part contact plates are provided by means of which the required operational voltage is transferrable on springloaded contact pins projecting on the handle part side beyond the heating arrangement, whereby the contact pin can be pushed in the assembled position against the spring force of the coilspring into the heating device and against the contact plates for electrical contact.

By way of the hand soldering device in accordance with the invention it is achieved that a hand soldering device is provided, which can be operated by means of one hand, whereby simultaneously selectively or in combination during the soldering procedure the supply of soldering material and/or flux and, if necessary, during the desoldering procedure the suction removal of soldering material and flux can be performed. Furthermore by way of the integrated arrangement of the reception chamber in the hand soldering device this can be designed relatively small in its size so that a simple and easy handling is ensured.

By way of a further feature of the invention, an environmentally friendly application of the hand soldering device in accordance with the invention is achieved because the consumed reception chamber is simply exchangeable and therewith can be refilled or emptied and be used again. Furthermore the exchange of the reception chamber can be performed at any time by the operating personnel so that the hand soldering device in accordance with the invention is only momentarily put out of operation. Also therewith only low service costs are incurred and also brief inoperative periods whereby a considerable cost saving in the running production process is achievable.

By way of a further features of the invention, it is achieved that the soldering material present in the soldering chamber during or shortly before the soldering procedure is brought to a melting liquid condition so that it can be supplied by displacement of the pressing piston for decreasing the chamber volume of the soldering chamber by way of the supply channel to the soldering point. The displacement movement of the pressing piston arranged in the soldering chamber thereby can take place mechanically or by way of an electrical motor or also pneumatically or hydraulically by pressure loading of the pressing piston rearside. During the soldering procedure thereby the required flux is supplied outside of the provided additional chamber by way of a second supply channel to the soldering tip and arrives together with the soldering material to the soldering tip so that a good soldering joint is achievable. The pressing piston of the additional chamber also is displaceable mechanically, pneumatically or hydraulically for decreasing the chamber volume of the additional chamber. Thereby it is possible to move the pressing piston of the additional chamber and the pressing piston of the soldering chamber commonly or separately, so that the flux and the soldering material can be supplied either together or separately to the soldering position depending on the respectively existing working conditions.

By means of the arrangement of the suction chamber outside the heating arrangement it is ensured that the liquid soldering material sucked into the suction chamber is immediately cooled off in the suction chamber and is transferred in a non-deformable condition so that after suction no soldering material can emerge unintentionally again at the soldering tip. The suction chamber provided thereby is loaded for suction of soldering material or flux material by way of vacuum so that it can be operated via the supply channel, or, insofar as the hand soldering device is provided with the soldering chamber, the additional chamber and the suction chamber by way of a separate suction channel to suck soldering material or flux by way of the soldering point from the soldering position. The auxiliary chamber and the suction chamber preferably are provided as separate components and are arranged in the handle part of the hand soldering device in accordance with the invention.

The auxiliary chamber and the suction chamber are exchangeably arranged in the handle part so that the auxiliary chamber can be refilled for repeated application and the suction chamber can be cleared for its repeated application. Furthermore also the soldering material regained from the suction chamber can be used again.

By using a venturi nozzle as suction arrangement simple and reliable suction is performable whereby the operation of the venturi nozzle is possible by means of a simple compression air valve, which can be operated manually or electrically.

By way of another feature of the invention the hand soldering device in accordance with the invention can be applied independently of an external compression air supply.

Still a further feature of the invention makes possible a small embodiment of the soldering points so that the hand soldering device in accordance with the invention also is suitable for application for fine soldering.

By way of a further feature of the invention, it is achieved that sucked off soldering material or flux cannot be sucked unintentionally into the subpressure channel of the venturi nozzle.

Furthermore the suction piston provided can be operated mechanically or also hydraulically.

By way of still further features of the invention, it is achieved that the hand soldering device in accordance with the invention can be used independently of a pneumatic or also hydraulic plant for pressure supply or vacuum supply.

Electric pushbutton switches and/or compressed air valves are provided arranged in the region of the handle part to provide a simple operation of the hand soldering device in accordance with the invention is ensured.

The heating device is preferably attached removably at the handle part and the soldering tip is removably attached at the handle part opposite to the end of the heating housing. The heating arrangement is preferably provided with joining channels which join the supply channel and/or the supply channels and/or the suction channel of the soldering tip with the soldering chamber and/or the auxiliary chamber and/or the suction chamber to provide a simple serve of the hand soldering device in accordance with the invention is made possible.

Preferably a separate control device is provided for compressed air and/or energy supply for controlling the compressed air and the temperature of the hand soldering device. Further, electrically operatable compressed air valves are preferably provided to provide a light and small construction of the hand soldering device in accordance with the invention so that this can be handled in simple manner.

By way of the embodiment of the electrical energy supply of the heating device according to claim 16 a reliable energy supply for the heating arrangement is ensured whereby simultaneously a simple demounting of the hand soldering device is ensured. Thus the hand soldering device in accordance with the invention can be serviced also by operating personnel not specially trained.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

The invention will now be described by way of example with reference to the accompanying schematic drawings.

In the drawings there is shown in:

FIG. 1 is a perspective exploded view of a hand soldering device in accordance with the invention;

FIG. 2 is a sectional view of the hand soldering device of Figure; and

FIG. 3 is a sectional view through the coupling flange of FIG. 1 or 2.

DESCRIPTION OF THE PREFERRED EMBODIMENT

Figure 2:
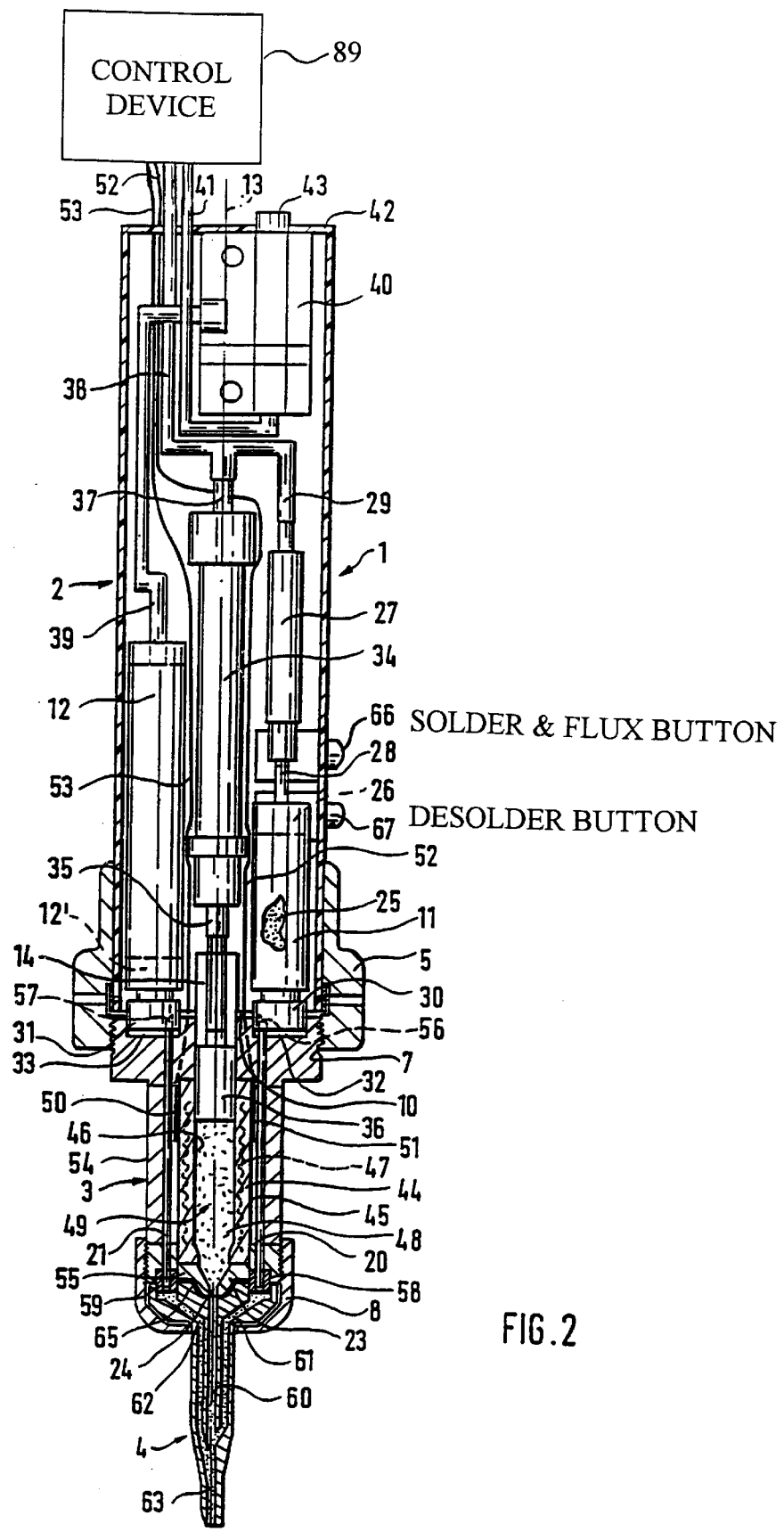

FIG. 1 shows a hand soldering device including a handle part 2, a heating device 3 and a soldering tip 4.

The handle part 2 is substantially cylindrically shaped and has a screw cap 5 at its side at the heat device, by means of which screw cap the heating device 3 is mounted rigidly at the handle part 2. For screw-connecting the heating device 3 by way of the screw cap 5 of the handle part 2 the heating device 3 has a radially outwardly stepped coupling flange 6, which is provided with an associated screw thread 7 at its housing surface. A second screw cap 8 is provided for attaching the soldering tip 4 to the heating device 3, which cap can be screwed onto an associated screw thread 9 at the soldering tip side end of the heating device 3.

The ends of a cartridge-like auxiliary chamber 11 and a cartridge-like suction chamber 12 axially project from the heating device side face 10 of the handle part 2. The auxiliary chamber 11 and the suction chamber 12 are arranged fixedly and exchangeably in the handle part 2. A piston 14 is provided in the center of the face 10 co-axially to the longitudinal central axis 13 of the handle part 2, which piston 14 is guided axially movable in the handle part 2. The auxiliary chamber 11 and the suction chamber 12 are arranged diametrically opposite and radially outwardly displaced in the piston ram 14. In the face 10 of the handle part 2 four contact plates 15, 16, 17 and 18 are arranged for current supply to the heat device 3 and for the temperature control, which contact plates lie on the same radius as the auxiliary chamber 11 and the suction chamber 12. The contact plates 15 and 16 serve for current supply to the heating device 3 and transfer the suitably required operational voltage, which is supplied by way of suitable supply conduits extending through the handle part from a separate control device 89 to the contact plates 15, 16, onto two associated contact pins (see FIG. 3), which axially project on the handle part side face 19 of the coupling flange 6 of the heating device 3 and are guided axially displaceable against a spring force in the coupling flange 6. In similar manner two further suitably arranged contact pins project beyond the faces 19 of the heating device 3, which are associated with the contact plates 17, 18 and which conduct the electrical signals of two temperature sensors (see FIG. 2 reference numerals 50, 51) located in the interior of the heating device 3 to the contact plates 17 or 18. From the contact plates 15, 16, 17, 18 associated signal conductors lead through the handle part 2 towards the control device, where the temperature signals are processed by way of a suitable control circuit for temperature control of the heating device 3 and to provide the heating device with the necessary operational voltage.

In the heating device 3 two tubular connection channels 20, 21 are arranged, which axially project beyond the soldering tip side face side 22 of the heating device 3. The connection channel 20 serves for connecting the auxiliary chamber 11 to the soldering tip 4 and the connection channel 21 joins the suction chamber 12 to the soldering tip 4, whereby the connection channel 20 terminates in a suitably arranged supply channel (not shown in the drawing) and the connection channel 21 terminates in a suitable suction channel (not shown in the drawing) of the soldering tip 4. Between the connection channels 20 and 21, which are diametrically opposite and are parallel to the longitudinal central axis 13 of the hand soldering device 1, a truncated conical axially projecting widened part 23 is provided, which has a soldering material supply hole 24.

FIG. 2 shows the hand soldering device 1 in longitudinal section. In the handle part 2 the auxiliary chamber 11 and the suction chamber 12 can be seen. The auxiliary chamber 11 serves for receiving a flux 25, such as a soldering tin, and is closed off to above by means of a pressing ram 26, which is movable in axial direction in the auxiliary chamber 11. Above the auxiliary chamber 11 a pneumatic cylinder 27 is provided, which is arranged co-axially to the auxiliary chamber 11 and has a piston rod 28 on the auxiliary chamber side. The pneumatic cylinder 27 serves for operating the pressing ram 26, in that, by way of a suitable compressed air supply conduit, can be provided in dosed form with compressed air from a storage container and therewith presses the pressing ram to below so that the flux 25 is pressed from the auxiliary chamber 11 into the connection channel. The auxiliary chamber 11 has a coupling section 30 axially projecting over the face 10 of the handle 2, which is provided with a face side wall bush membrane (not shown in the drawing).

The suction chamber 12 is arranged diametrically opposite to the auxiliary chamber 11 and has a coupling section 31 projecting beyond the face 10 of the handle part 2, which also is provided with a wall bush membrane (not shown in the drawings).

The auxiliary chamber 11 and the suction chamber 12 are arranged fixedly and exchangeably in suitable receiving holes in the handle part 2. The heating device 3 is screwed on by means of the screw cap 5 at the lower end of the handle part 2. The screw thread 7 is provided at the coupling flange 6 for screwing by means of the screw cap 5. The coupling flange 6 is provided with two diametrically opposite cylindrical recesses 32 and 33, in which the respective coupling section 30 or 31 of the auxiliary chamber 1 1 of the suction chamber 12 project in assembled condition with play so that the heating device 3 with the coupling flange 6 is non-rotatable and is screwable in a predetermined position at the handle part 2.

In the handle part 2 there is provided between the auxiliary chamber 11 and the suction chamber 12 a central pneumatically operating cylinder 34, which extends centrally co-axially to the handle part 2, which at its soldering tip side end is provided with a piston rod 35 with the pressing ram 14. At its end opposite to the pressing ram 14 the working cylinder 34 has a pipe connection 37 by means of which the working cylinder 34 is joined to the compressed air conduit 38. The compressed air conduit 38 serves for common compressed air supply both of the working cylinder 34 and the pneumatic cylinder 27 via its compressed air supply conduit 29.

The suction chamber 12 is joined by means of a vacuum conduit 39 to a venturi nozzle 40, which serves as suction arrangement for creating a subpressure in the suction chamber 12. The venturi nozzle 40 is joined to a compressed air conduit 41, by means of which compressed air is supplied to the venture nozzle 40 for producing a sub-pressure in the sub-pressure conduit 39. The two compressed air conduits 38 and 41 pass through the rear housing wall 42 of the handle part 2 and are respectively joined by way of a joining conduit (not shown in the drawing) to the control device. The venturi nozzle 40 has an aeration pipe connection 43, which also passes through the housing wall 42, so that compressed air supplied to the venturi nozzle 40 can escape freely from the venturi nozzle 40 to the outside. A suction piston 12' is provided in the suction chamber 12 in order to prevent that during suction of soldering material from a soldering joint by accident soldering material arrives into the sub-pressure conduit 39, which suction piston 12' is moved in the suction chamber 12 during the suction procedure by way of the sub-pressure axially in the direction towards the sub-pressure conduit 39 and thereby soldering material is sucked into the suction chamber 12 by way of the soldering tip 4.

In the heating arrangement 3 a central heating element 44 is provided, which extends co-axially to the longitudinal central axis 13 in the heat arrangement and is designed as double walled heating tube. Between the outer heating tube 45 and the inner heating tube 46 of the heating element 44 an electrical heating coil 47 is provided, which serves for heating the soldering tip 4. In the inner heating tube 44 a soldering chamber 48 is provided, which serves for receiving the soldering material 49. The soldering chamber 48 thereby is thermally coupled to the heating element 44 so that during soldering the soldering material 49 can be brought into molten liquid condition in the soldering chamber 48 by way of the heating element 44. In the soldering chamber 48 a soldering pressing piston 36 is provided which is axially displaceable into the soldering chamber 48 by means of the pressing ram 14 of the working cylinder 34 for decreasing the chamber volume of the soldering chamber 48.

Two diametrically opposite temperature sensors 50 and 51 are arranged at the outer side of the outer heating tube 45, which sensors are joined by means of suitable signal conductors 52 and 53 to the control device. The temperature sensors 50 and 51 serve, together with the control device, for the temperature control of the heating element 44 so that a pre-selected optimum soldering temperature is always present at the soldering tip 4.

The heating device 3 has an outer housing tube 54, which is closed on the soldering tip side by means of a screwed on heating lid 55. The heating lid 55 is provided with a conical-like widened part 23, which has a central soldering material supply hole 24, which is in communication with the soldering chamber 48.

The two connection channels 20 and 21 are arranged diametrically opposite between the outer housing tube 54 and the outer heating tube 45. On the handle part side the connection channels 20 and 21 pass through the coupling flange 6 in the region of its two recesses 32 or 33, whereby they are provided with sharply grinded end tips 56, 57 by means of which they respectively pierce through the wall bush membrane of the associated auxiliary chamber 11 or suction chamber 12 when being assembled and therewith are in communication with the hollow space of the auxiliary chamber 11 or the suction chamber 12. The connection channels 20 and 21 pass through the heating lid 55 on the soldering tip side, in that they are provided at their ends respectively at a temperature resistant sealing cylinder 58 or 59.

The soldering tip 4 is screwed fixedly by way of the screw cap 8 onto the heating lid 55 or the housing tube 54 of the heating device 3.

In the heating tip 4 a central soldering material supply channel 60 is provided, which extends co-axially to the soldering tip 4 and is joined to the soldering material supply hole 24. The soldering tip 4 has an auxiliary chamber 61 and a radially opposite suction channel 62, whereby the auxiliary chamber 61 is joined by way of the connection channel 20 to the auxiliary chamber 11 and the suction chamber 62 by way of the connection channel 21 to the suction chamber 12. The soldering material supply channel 60, the auxiliary channel 61 and the suction channel 62 converge in a common end channel 63 extending co-axially to the soldering tip 4, the outlet opening 64 of which is at the lower end of the soldering tip 4. In the region of the conically shaped widened part 23 a temperature resistant seal 65 with a suitable through hole is provided.

The handle part 2 has two electrical push button switches 66 and 67 in the region of its screw cap 5 for joining it by means of suitable connection conductors (not shown in the drawing) to the control device (not shown in the drawing). Electrically controlled compressed air valves provided in the control device are controllable by means of these push button switches 66 and 67, by way of which valves the compressed air conduit 38 of the pneumatic cylinder 27 and the working cylinder 34 or the compressed air conduit 31 of the venturi tube 40 can be charged with compressed air.

By operating the push button switch 66 the compressed air valve in the control device is opened for the compressed air conduit 38 so that the pneumatic cylinder 27 or the working cylinder 34 simultaneously is provided with compressed air and their piston rods 28 or 35 are moved towards the soldering tip 4 and therewith the flux is transported from the auxiliary chamber 11 and the soldering material from the soldering chamber 48 towards the soldering tip 4. The soldering material thus arrives by way of the soldering material supply hole 24, the soldering material supply channel 60 and the end channel 63 to the end of the soldering tip 4, where it emerges from the discharge opening 64 and arrives for soldering at the soldering joint. Simultaneously flux emerges at the discharge opening 64 of the end channel 63, which flux is transported from the auxiliary chamber 11 via the connection conduit 20 and the auxiliary channel 61 into the end channel 63. On releasing the push button switch 66 the electrically compressed air valve in the control device is closed so that the pneumatic cylinder 27 and the working cylinder 34 do not further receive compressed air and therewith the transportation procedure of the soldering material on the one hand and the flux material 25 on the other hand is interrupted.

By selecting a suitable small cross-section of the auxiliary channel 61, the soldering material supply channel 60 and the end channel 63 it is achieved that, in pressureless condition, that is on interrupted transportation procedure due to the capillary action no soldering material and no flux material can emerge unintentionally from the discharge opening 64.

The second push button switch 67 serves for operating the second compressed air valve in the control device, whereby, by opening this compressed air valve, the venturi nozzle 40 is charged with compressed air and sub-pressure is created in the sub-pressure conduit 39, which becomes effective by way of the suction chamber 12, the connection channel 21 and the suction channel 62 at the soldering tip 4 so that, by way of the hand soldering device 1 two components to be soldered together, can be desoldered and can be separated from each other. A separate stationary compressor can be provided for compressed air supply to the control device which compressor can be joined to the compressed air valves of the control device by way of suitable suppressed air supply conduits.

FIG. 3 shows the coupling flange 6 of the heating device 3 in section in that the sectional plane passes through two of the four already above mentioned contact pins 68 and 69. The contact pins 68 and 69 are associated with the two contact plates 15 and 16 of the handle part 2 and serve for the supply of voltage or current to the heating element 44. The recess 33 located behind the above described sectional plane, for the coupling section 31 of the suction chamber 12 as well as the upper end of the associated connection channels 21 are respectively shown in dotted lines. Furthermore, as can be seen, a through hole 70 for guiding the pressing piston 14 or for receiving the soldering chamber 48 is arranged centrally co-axially in the coupling flange 6 (shown in dotted lines). A recess 71 arranged suitably symmetrically to the longitudinal central axis 72 of the coupling flange 6 is provided for the central reception of the heating element 44.

The contact pins 68, 69 are respectively formed at a contact bush 73 or 74, which are axially displaceably supported in a handle part side blind hole 75 or 76 of the coupling flange 6 by way of a compression spring 77 or 78. The blind holes 75, 76 respectively have a lower soldering tip side central through hole 79 or 80 by way of which a connection conduit 81 or 82, provided with an electrically insulating synthetic material sleeve for energy supply of the heating element 44, is led to below on the soldering tip side to below.

The connection conduits 81, 82 are respectively clamped by way of their upper ends by means of an electrically conducting clamping bush 85 or 86 in a through hole 83 or 84, which is widened and stepped on the upper side, in the contact bushes 73, 74. For securing a perfect electrical connection between the clamping bushes 85, 86 and the associated clamp joining conduit 81 or 82 the joining conduits 81, 82 are insulated at their upper ends clamped in the clamping bushes 85, 86, that is in this region the synthetic material housing has been removed. The contact bushes 73, 74 or also the blind holes 75, 76 are provided suitably with an electrically insulating synthetic material layer for preventing a short circuit between the contact bushes 73, 74. Furthermore, also for the coupling flange 6, an electrical non-conducting material can be provided.

A clamping bush 87 or 88 is provided in the region projecting out of the coupling flange 6 at each joining conductor 81 or 82 in order to prevent that the contact bushes 73, 74 in the disassembled condition of the heating device shown in FIG. 3 slip out from the handle part 2 out of their blind holes 75, 76, which clamping sleeves are clamped axially non-displaceably at the respectively joining conductor 81 or 82. The distance between the clamping bushes 85, 86 and the clamping sleeves 87, 88 at the connection conductors 81, 82 thereby is selected such that the contact bushes 73, 74 project axially under slight pretension of the compression screws 77, 78 out of the faces 19 of the coupling flange 6 in that they are axially guided by way of their respective lower ends securely in the respective blind hole 75 or 76.

During the assembly of the heating device 3 with its coupling flange 6 at the handle part 2, the contact bushes 73, 74 are pushed against the spring forces of the compression springs 77, 78 into their respective blind holes 75, 76. In the assembled condition thereby the compression springs 77, 78 press the contact bushes 73, 74 against the respectively associated contact plates 15 or 16 of the handle part 2, so that a secure electrical connection is created.

It is clear that similarly designed contact pins are allocated to the two other contact plates 17, 18 of the handle part. Thereby the correspondingly associated connection conductors serve as signal conductors (see FIG. 2 reference numerals 52, 53), which suitably are joined to the temperature sensors 50, 51 of the heating element 54.

A simple demounting and assembly of the hand soldering device 1 for exchanging the auxiliary chamber 11, the suction chamber 12 and the soldering chamber 48 can be performed by way of the embodiment of the above described electrical coupling of the contact pins 68, 69 to the associated contact plates 15, 16 of the power supply for the heating element as well as the signal transmission from the temperature sensors 50, 51 to the control device. In the assembled condition thereby always a reliable electrical contact is ensured between the contact pins 68, 69 and the associated contact plates 15, 16 or the contact plates 17, 18 and the corresponding contact pins for the signal (not visible in the drawing).

In the control device, which is not shown in the drawing, there are, in addition to two electrical pressure valves, also all essential electronic components for temperature control of the heating element. By way of the signal conductors the signals caused during heating of the heating element of the temperature sensors 50, 51 are transmitted to the control device by means of which the heating element 44 is controlled and is heated to an adjustable soldering temperature and is maintained at this temperature.

By way of the embodiment in accordance with the invention therewith the hand soldering device 1 can be used by one hand whereby both the soldering material as well as flux can be supplied by simple operation of the push button 66 to the soldering tip 4 and therewith the soldering joint whereby the other hand of the operating person is available for handling components to be soldered.

Also an embodiment of the hand soldering device 1 in accordance with the invention is provided whereby, for compressed air supply of the pneumatic cylinder 27 and/or the working cylinder 34 and/or the venturi nozzle 40, a compressed air cartridge is provided integrated in the handle part 2. In place of the electrical push button switches 66 and 67 in this case suitable manually operable compressed air valves are provided, which, by way of compressed air channels suitably provided in the handle part 2, on the one hand, are in pneumatical communication with the compressed air cartridge and, on the other hand, with the pneumatic cylinder 27 and/or the working cylinder 34 and/or the venturi nozzle 40. Thereby the hand soldering device can be applied independent of a stationary fixed compressed air supply, such as for example a compressor. It follows that the compressed air cartridge thus is fitted replaceably in the handle part.

Furthermore also a hydraulic variation of the hand soldering device is provided of which the functional manner merely differs by the use of a hydraulic system in place of the above described pneumatic system of the hand soldering device 1. Also an electrically operable variation is conceivable by means of which for example, a pump piston driven by a spindle drive driven by means of an electrical motor is provided directly in the auxiliary chamber and/or the soldering chamber and/or the suction chamber, which can be suitably controlled by manually operable electrical push button switches in the handle bar.

The hand soldering device furthermore is constructed to be recycled. Both the soldering tip 4 with its supply channels 60, 61 or its suction channel 62, are exchangeable and easy to clean. Also the suction chamber 12, the auxiliary chamber 27 and the soldering chamber 48 can be processed or filled again. Hereby it must be mentioned that in the suction chamber 12 also a soldering wire can be provided by means of which the sucked molten liquid soldering material, on reaching the suction chamber 12 can be automatically sucked so that therewith it also can be prevented that during suction soldering material is sucked unintentionally to the subpressure conduit.

It is to be understood that the hand soldering device in accordance with the invention also can be used as a conventional hand soldering device to which soldering material and/or flux can be supplied separately from the outside. It is also possible to provide the auxiliary chamber 11, the suction chamber 12 and the soldering chamber 48 individually or in different combinations to take care of different requirement selections regarding different soldering procedures.

While specific embodiments of the invention have been shown and described in detail to illustrate the application of the principles of the invention, it will be understood that the invention may be embodied otherwise without departing from such principles.

I claim:

1. A hand soldering device, comprising:
   a heat insulated handle part;
   a soldering tip; and
   a heating device for heating the soldering tip to a predetermined soldering temperature, one or both of said handle part and a region of said heating device having a suction channel, a supply channel, a solder/flux reception chamber for one of soldering material and flux, said solder/flux reception chamber including means for supplying said one of soldering material and flux material in liquid form to said soldering tip via said supply channel; and a suction reception chamber including means for sucking one of soldering material and flux material from a soldering joint via said suction channel.

2. The hand soldering device according to claim 1, wherein said solder/flux reception chamber and said suction reception chamber are cylindrically shaped and are integratedly arranged as separate constructional parts exchangeably in the hand soldering device.

3. The hand soldering device according to claim 1, wherein said heating device comprises a double-walled heating element including a temperature sensor, an outer heating tube, an inner heating tube and an electrical heater coil, said electrical heater coil arranged between said inner heating tube and said outer heating tube, said solder/flux reception chamber includes a solder reception chamber extending at least partially into said heating device, and a flux reception chamber for flux.

4. The hand soldering device according to claim 3, wherein said solder reception chamber has a pressing piston for dosed feeding of soldering material to said soldering tip, said pressing piston being displaceable mechanically, pneumatically or hydraulically in said soldering reception chamber and said flux reception chamber has a pressing piston for dosed feeding of flux material to said soldering tip, said pressing piston being displaceable mechanically, pneumatically or hydraulically in said flux reception chamber.

5. The hand soldering device according to claim 1 wherein said suction reception chamber is arranged in the hand soldering device outside said heating device and is joined to a subpressure-producing suction arrangement, said suction reception chamber being joined to said soldering tip by means of said suction channel, said suction channel leads through said soldering tip.

6. The hand soldering device according to claim 5, wherein said suction arrangement includes a venturi tube, charged by way of a manually or electrically controllable compressed air valve from a compressed air reservoir with compressed air, said suction arrangement producing a sub-pressure by way of a sub-pressure conduit in said suction chamber.

7. The hand soldering device according to claim 6, wherein said compressed air reservoir is integratedly arranged as a compressed air cartridge in said handle part and is joined by way of manually or electrically controlled compressed air valves to one of said venturi nozzle and to the soldering chamber and said flux chamber.

8. The hand soldering device according to claim 1, wherein said suction channel leads through said soldering tip together with one of said supply channel and a supply channel of a soldering chamber and flux chamber in a common end channel, said end channel having an outlet opening arranged at an outer end of said soldering tip.

9. The hand soldering device according to claim 1, further comprising: a suction piston arranged in said suction chamber, said piston being displaceable in said suction chamber and said suction piston being one of pneumatically or hydraulically axially movable in the suction chamber.

10. The hand soldering device according to claim 9, further comprising: a spindle drive in said suction chamber, said suction piston being electrically motor movable by said spindle drive.

11. The hand soldering device according to claim 4, further comprising: a spindle drive in one of said solder reception chamber and said flux reception chamber, said pressing piston being electrically motor movable by said spindle drive.

12. The hand soldering device according to claim 4, further comprising: one of manually operable electrical push button switches and compressed air valves provided arranged in said handle part.

13. The hand soldering device according to claim 1, wherein said heating device is attached removably to said handle part and said soldering tip is removably attached to said handle part opposite to the end of said heating device.

14. The hand soldering device according to claim 13, wherein said heating device is provided with joining channels which join one of said supply channel and the suction channel of the soldering tip with said solder/flux reception chamber and said suction reception chamber.

15. The hand soldering device according to claim 1, further comprising an energy and compressed air supply control device for controlling a compressed air supply for one of said solder/flux reception chamber and a venturi nozzle and a temperature of the hand soldering device.

16. The hand soldering, device according to claim 15, further comprising electrically operable compressed air valves provided in said control device for compressed air control for one of said solder/flux reception chamber and said venturi nozzle, which are valves controllable by means of manually operable electrical push button switches arranged in said handle part.

17. The hand soldering device according to claim 1, wherein said heating device has a coupling flange for releasable attachment to the handle part, by way of which it is fixedly attachable by means of a screw cap at the handle part, and for energy supply of the heating device in the handle part contact plates are provided by means of which the required operational voltage is transferrable on spring-loaded contact pins projecting on the handle part side beyond the heating arrangement, whereby the contact pin is adapted to be pushed in the assembled position against the spring force of the spring into the heating device and against the contact plates for electrical contact.

18. A device in accordance with claim 1, wherein:

said suction and supply channel extend through said soldering tip;

said means for supplying solder liquifies the soldering material in said solder/flux reception chamber and forces the liquified solder through said supply channel in said soldering tip.

19. A hand soldering device, comprising:

a heat insulated handle part;

a soldering tip;

a heating device for heating the soldering tip to a predetermined soldering temperature, one or both of said handle part and a region of said heating device having a suction channel, a supply channel, a solder/flux reception chamber for one of soldering material and flux, said solder/flux reception chamber including means for supplying said one of soldering material and flux material in dosed form to said soldering tip via said supply channel; and a suction reception chamber including means for sucking one of soldering material and flux material from a soldering joint via said suction channel, said solder/flux reception chamber and said suction reception chamber are cylindrically shaped and are integratedly arranged as separate constructional parts exchangeably in the hand soldering device.

20. A hand soldering device, comprising:

a heat insulated handle part;

a soldering tip;

a heating device for heating the soldering tip to a predetermined soldering temperature, one or both of said handle part and a region of said heating device having a suction channel, a supply channel, a solder/flux reception chamber for one of soldering material and flux, said solder/flux reception chamber including means for supplying said one of soldering material and flux material in dosed form to said soldering tip via said supply channel;

a suction reception chamber including means for sucking one of soldering material and flux material from a soldering joint via said suction channel;

an energy and compressed air supply control device for controlling a compressed air supply for one of said solder/flux reception chamber and a venturi nozzle and a temperature of the hand soldering device.

* * * * *